(12) United States Patent
Imagawa

(10) Patent No.: US 11,060,597 B2
(45) Date of Patent: Jul. 13, 2021

(54) ROTATION DECELERATION TRANSMISSION APPARATUS

(71) Applicant: SKG INC., Joetsu (JP)

(72) Inventor: Yutaka Imagawa, Joetsu (JP)

(73) Assignee: SKG INC., Joetsu (JP)

( * ) Notice: Subject to any disclaimer, the term of this patent is extended or adjusted under 35 U.S.C. 154(b) by 210 days.

(21) Appl. No.: 16/353,483

(22) Filed: Mar. 14, 2019

(65) Prior Publication Data

US 2020/0292046 A1 Sep. 17, 2020

(51) Int. Cl.
*F16H 49/00* (2006.01)
*B25J 9/10* (2006.01)

(52) U.S. Cl.
CPC ............ *F16H 49/001* (2013.01); *B25J 9/102* (2013.01); *F16H 2049/003* (2013.01)

(58) Field of Classification Search
CPC .. F16H 49/001; F16H 2049/003; B25J 9/1025
See application file for complete search history.

(56) References Cited

U.S. PATENT DOCUMENTS

| | | | | |
|---|---|---|---|---|
| 4,969,376 A | * | 11/1990 | Fickelscher | ........... F16H 49/001 475/180 |
| 5,054,332 A | | 10/1991 | Terauchi et al. | |
| 2012/0270692 A1 | * | 10/2012 | Hoebel | ................... B60K 7/00 475/149 |
| 2016/0107322 A1 | * | 4/2016 | Miyazaki | ............ B25J 19/0091 74/640 |
| 2016/0201783 A1 | * | 7/2016 | Miyake | ................. F16H 49/001 74/640 |
| 2016/0245386 A1 | * | 8/2016 | Rossberger | ............ B62M 23/00 |
| 2019/0063310 A1 | * | 2/2019 | Yanai | ..................... F02B 75/32 |

FOREIGN PATENT DOCUMENTS

| | | |
|---|---|---|
| CN | 108953503 A | 12/2018 |
| JP | 60-98246 A | 6/1985 |
| JP | 61-146490 A | 7/1986 |
| JP | 64-11777 A | 1/1989 |
| JP | 2018-194150 A | 12/2018 |
| KR | 10-2018-0127885 A | 11/2018 |
| TW | 201901062 A | 1/2019 |

* cited by examiner

*Primary Examiner* — Terence Boes
(74) *Attorney, Agent, or Firm* — Birch, Stewart, Kolasch & Birch, LLP

(57) ABSTRACT

An oval shaft that includes a cam body integrated with a rotation input section and rolling elements that are sandwiched between an inner ring provided at the outer periphery of the cam body and a flexible outer ring; an internal gear having an inner gear formed at the inner periphery; a flex gear having outer gears that have a reduced teeth number relative to the inner gears so that, when the outer gears are provided at the outer periphery of the oval shaft, the outer gears are engaged with the inner gears at a plurality of engagement positions, the flex gear has a plurality of transmission pins; and a rotation output mechanism having an output plate having an engagement section including an engagement hole that is engaged with each transmission pin and that is provided along the circumferential direction with a predetermined interval to allow the displacement of the transmission pin in the circumferential direction and/or the radiation direction during the rotation transmission.

9 Claims, 12 Drawing Sheets

ROTATION DECELERATION TRANSMISSION APPARATUS

TECHNICAL FIELD

This invention relates to a rotation deceleration transmission apparatus included in a robot for example to receive a rotational motion to decelerate the rotational motion and output the resultant motion.

BACKGROUND ART

Generally, a production line of a production plant requiring mass productivity includes therein an industrial robot configured by connecting a plurality of arm sections by a joint mechanism. The joint mechanism includes a rotation deceleration transmission apparatus that connects an end of an arbitrary arm section to an end of another arm section in a rotatable manner and that can decelerate the rotation of a drive motor included in an arbitrary arm section to about $\frac{1}{100}$-$\frac{1}{200}$ of the rotation to use the decelerated rotation output to drive another arm section to rotate. Thus, this type of the rotation deceleration transmission apparatus is required to provide accurate positioning control, angle control, and speed control for example.

Conventionally, rotation deceleration transmission apparatuses satisfying such requirements include a widely-used reducer using a wave-motion gear mechanism called the Harmonic Drive®. Known robot or robot-related apparatus including this wave-motion gear mechanism include, for example, the motor apparatus disclosed in Patent Publication 1, the industrial robot wrist mechanism disclosed in Patent Publication 2, and the multijoint robot disclosed in Patent Publication 3.

In this case, the motor apparatus disclosed in Patent Publication 1 includes a cup-like housing; a harmonic reducer that is configured so that a ring-like circular spline is supported by the inner periphery of this housing in a rotatable manner and that has a cup-like flexspline provided at the inner side of this circular spline and fixed at the housing to be biased by a wave generator to be engaged with a circular spline; and a liquid pressure motor configured so that one end of a support shaft is fixed to the housing, and a casing rotating around this support shaft is provided in the flexspline and includes the wave generator. The rotation output may be extracted from the circular spline.

The industrial robot wrist mechanism disclosed in Patent Publication 2 is configured to have the third axis to allow the entire wrist to rotate that is supported rotatably around an arm axis supported by an arm; the second axis that is supported by this third axis and that causes a wrist tip end supported rotatably around an axis orthogonal to the third axis to move in an inward manner; and the first axis that is supported by the second axis and that provides the rotation of a tool gripper of a wrist tip end rotatably supported around an axis orthogonal to the second axis. The first axis and the second axis are configured so as to have a reduced speed in the wrist by reducers superposed on the same center axis, and the third axis is configured to have a reduced speed in advance at the exterior of the wrist.

Furthermore, the multi joint robot disclosed in Patent Publication 3 is a multijoint robot having at least two control arms and two reducers opposed on the same axis provided on a joint section of both of the control arms. The multijoint robot is composed of the first and second harmonic drive reduction gears that include a common circular spline in which the two reducers are fixed to the joint section of one control arm and a bracket that is attached so as to be rotatable with the circular spline at one end of the common circular spline and that is connected to the joint section of the other control arm.

SUMMARY OF INVENTION

Technical Problem

However, the above-described conventional rotation deceleration transmission apparatus including the wave-motion gear mechanism has disadvantages as described below.

Firstly, main components are included such as the flexspline, the wave generator, and the circular spline. The flexspline has an entirely cup-like shape by a thin-walled metal elastic plate and is configured so that a gear wheel section formed at the outer periphery of an elliptically-deformed opening section is engaged with a gear wheel section formed at the inner periphery of a circular spline having a fixed position. Thus, the flexspline integrated to have a cup-like shape must be manufactured as a high precision part, which renders manufacture difficult and increases cost. Furthermore, the flexspline tends to have metal fatigue and malfunctioning due to the use and also has low durability. Consequently, the conventional wave-motion gear mechanism undesirably requires a significant increase both in the initial cost and the running cost.

Secondly, the flexspline formed to have a cup-like shape is configured so that the outer periphery of the opening section has a gear wheel section, and this gear wheel section is wave-deformed by an elliptical wave generator, and the center of the bottom is connected to an output axis that outputs a decelerated rotation. Thus, the functioning of the flexspline requires the flexspline to have a fixed length in the axial direction. This causes a limitation on the deceleration transmission apparatus in which the entire structure has a thinner thickness (or a smaller size).

Thirdly, the flexspline has the entirely-cup-like shape and has one end at which the blocked bottom center is connected to the output axis. This causes a difficulty in securing a space in which the connection cable can be arranged. In the case of a robot including many joint mechanisms and many drive motors for realizing various motions in particular, the connection of these drive motors and a robot controller requires connection cables whose number must be at least equal to the number of the drive motors, and the connection cables in such a number must be arranged. Thus, further improvement has been required also from the viewpoint of securing the space in which many connection cables can be arranged.

Solution to Problem

It is an objective of this invention to provide a rotation deceleration transmission apparatus for which the disadvantage existing in the prior art as described above is solved.

In order to solve the above-described disadvantage, a rotation deceleration transmission apparatus 1 according to this invention is a rotation deceleration transmission apparatus that receives rotational motion to reduce the speed and output the resultant reduced speed. This rotation deceleration transmission apparatus is configured to include: a rotation input section 2 for receiving rotational motion; an oval shaft 3 that includes a cam body 3c rotating with this rotation input section 2 in an integrated manner and a plurality of rolling elements 3bm . . . that are sandwiched between an inner ring 3bi provided along the outer periphery of the cam body 3c and a flexible outer ring 3bo; an internal gear 5 having an inner gear 5g at the inner periphery and having a fixed position; a flex gear 4 having outer gears 4g that are formed along the circumferential direction Ff of the outer periphery and that have a smaller teeth number than that of the inner gears 5g so that, when the outer gears 4g are provided at the outer periphery of the oval shaft 3, the outer gears 4g are engaged with the inner gears 5g at a plurality of engagement positions T . . . in the circumferential direction Ff, the flex gear 4 has a plurality of transmission pins 4p . . . that protrude from a side face and that are provided along the circumferential direction Ff to have a predetermined interval thereamong; and a rotation output mechanism 6 having an output plate 7 having an engagement section 7s . . . including an engagement hole 7sh . . . that is engaged with each transmission pin 4p . . . and that is provided along the circumferential direction Ff with a predetermined interval to allow the displacement of the transmission pin 4p . . . in the circumferential direction Ff and/or the radiation direction Fd during the rotation transmission.

In this case, according to a preferred embodiment of the invention, the transmission pin 4p . . . can be composed of a transmission pin body 4pm . . . protruding from the flex gear 4 and a transmission roller 4pr . . . having the center position rotatably supported around the transmission pin body 4pm . . . as an axis. The output plate 7 can be formed to have a ring-like shape. On the other hand, the engagement section 7s . . . may be configured by a multidirectional engagement hole 7sm . . . that is formed in the output plate 7 and that is always abutted to the peripheral surface of the transmission pin 4p . . . and that allows the displacement of the output plate 7 in the circumferential direction Ff and the radiation direction Fd of the output plate 7 or may also be configured by an elastic engagement section 7sd . . . that protrudes from the output plate 7 in the radiation direction Fd and that is always abutted to the peripheral surface of the transmission pin 4p . . . and that has a one-direction engagement hole 7ss . . . to allow the displacement of the transmission pin 4p . . . in the radiation direction Fd to thereby provide the elastic displacement in the circumferential direction Ff. In this case, the output plate 7 can be configured by layering a plurality of spring plate members 7p . . . having a predetermined thickness Ls in the axial direction Fs. On the other hand, the rotation input section 2 can be configured by a cylindrical input rotation body 11 in which the interior of an inner periphery face 11i is included in a wiring space S of cables Ka, Kb . . . and an outer periphery face 11o includes at least the cam body 3c of the oval shaft 3. The flex gear 4 can be engaged at two engagement positions T, T having a positional relation of 180[°] relative to the inner gear 5g.

Advantageous Effects of Invention

The rotation deceleration transmission apparatus 1 according to this invention having a configuration as described above provides remarkable effects as shown below.

(1) The conventional flexspline having an entirely cup-like shape using a thin-walled metal elastic plate member is no more required. Thus, the manufacture can be achieved easily, the manufacture cost can be significantly reduced, and the metal fatigue and malfunctioning for example can also be significantly reduced. Thus, the durability and the reliability can be improved, thus providing a significant reduction in the initial cost and the running cost.

(2) The elimination of the need for the conventional flexspline can provide the reduction of the layout space in the axial direction Fs. Thus, the entire structure can have a thinner thickness, thus easily achieving the further downsizing of, in particular, industrial robots for which the downsizing has been limited for example.

(3) According to the preferred embodiment, the transmission pin 4p . . . is composed of the transmission pin body 4pm . . . protruding from the flex gear 4 and the transmission roller 4pr . . . having a center position rotatably supported around the transmission pin body 4pm . . . as an axis. This can reduce, when the transmission pin 4p . . . is engaged with the engagement hole 7sh . . . , the contact friction between the transmission pin 4p . . . and the engagement hole 7sh . . . . Thus, the rotation transmission from the flex gear 4 to the output plate 7 can be performed in an efficient and stable manner, and the unnecessary heat generation or abrasion can be excluded so that the reliability in long-term use can be increased.

(4) According to the preferred embodiment, the output plate 7 formed to have a ring-like shape can provide the wiring space for the cables Ka, Kb . . . and can be combined with the cylindrically-formed input rotation body 11 in particular to thereby contribute to the entire structure having a simpler design and higher rigidity.

(5) According to the preferred embodiment, the engagement section 7s . . . is configured by forming the multidirectional engagement hole 7sm . . . in the output plate 7 so that the multidirectional engagement hole 7sm . . . is always abutted to the peripheral surface of the transmission pin 4p . . . and allows the displacement of the transmission pin 4p . . . in the circumferential direction Ff and the radiation direction Fd of the output plate 7. This configuration can absorb, by the so-called cam method, the displacement of the transmission pin 4p . . . in the circumferential direction Ff and the radiation direction Fd relative to the engagement hole 7sh . . . caused at a different position in the circumferential direction Ff. This can exclude the unnecessary stress caused when the engagement hole 7sh . . . is engaged with the transmission pin 4p . . . to provide the rotation transmission from the transmission pin 4p . . . to the output plate 7 in a stable and smooth manner and can provide an accurate rotation transmission by an increased rigidity in particular.

(6) According to the preferred embodiment, the engagement section 7s . . . is configured by forming the one-direction engagement hole 7ss . . . that protrudes from the output plate 7 in the radiation direction Fd and that is always abutted to the peripheral surface of the transmission pin 4p . . . , and that allows the displacement of the transmission pin 4p . . . in the radiation direction Fd. The configuration of the one-direction engagement hole 7ss . . . allows the elastic displacement of the elastic engagement section 7sd . . . in the circumferential direction Ff. This configuration can absorb, by the so-called elastic method, the displacement in the circumferential direction Ff in particular of the transmission pin 4p . . . relative to the engagement hole 7sh . . . caused at a different position of the circumferential direction Ff. This can exclude the unnecessary stress caused when the engagement hole 7sh . . . is engaged with the transmission pin 4p . . . to thereby provide the rotation transmission from the transmission pin 4p . . . to the output plate 7 in a stable and smooth manner. The elimination of the need for a high machining accuracy in particular can achieve an easy and low-cost implementation.

(7) According to the preferred embodiment, the output plate 7 is configured by layering the plurality of spring plate members 7p . . . having the predetermined thickness Ls in the axial direction Fs. This configuration can provide an appropriate elasticity even when the output plate 7 has a thick thickness, thus providing the rotation transmission from the transmission pin 4p . . . to the output plate 7 accurately.

(8) According to the preferred embodiment, the rotation input section 2 is configured by the cylindrical input rotation body 11 in which the interior of the inner periphery face 11*i* is used as the wiring space S for the cables Ka, Kb . . . and the outer periphery face 11*o* includes at least the cam body 3*c* of the oval shaft 3. This can secure the wiring space for the cables Ka, Kb . . . to accommodate other peripheral structures even when the number of the cables Ka . . . is increased, thus preventing a complicated entire structure.

(9) According to the preferred embodiment, the flex gear 4 is engaged at the two engagement positions T, T having a positional relation of 180[°] relative to the inner gear 5*g* of the internal gear 5. This allows the flex gear 4 to have the simplest elliptical shape. Thus, a lower accuracy is required than in the case where the flex gear 4 is engaged at three or more engagement positions T . . . for example. Thus, the manufacture and machining can be performed in an easier manner, and the durability, noise reduction, and reliability can be improved.

DESCRIPTION OF EMBODIMENTS

Next, the following section will describe a preferred embodiment of this invention in detail based on the drawings.

First, in order to simplify the understanding of the rotation deceleration transmission apparatus 1 according to the preferred embodiment, the following section will describe the configuration and operation of a rotation deceleration transmission apparatus 100 according to a basic embodiment with reference to FIG. 1-FIG. 10.

Figure 9:
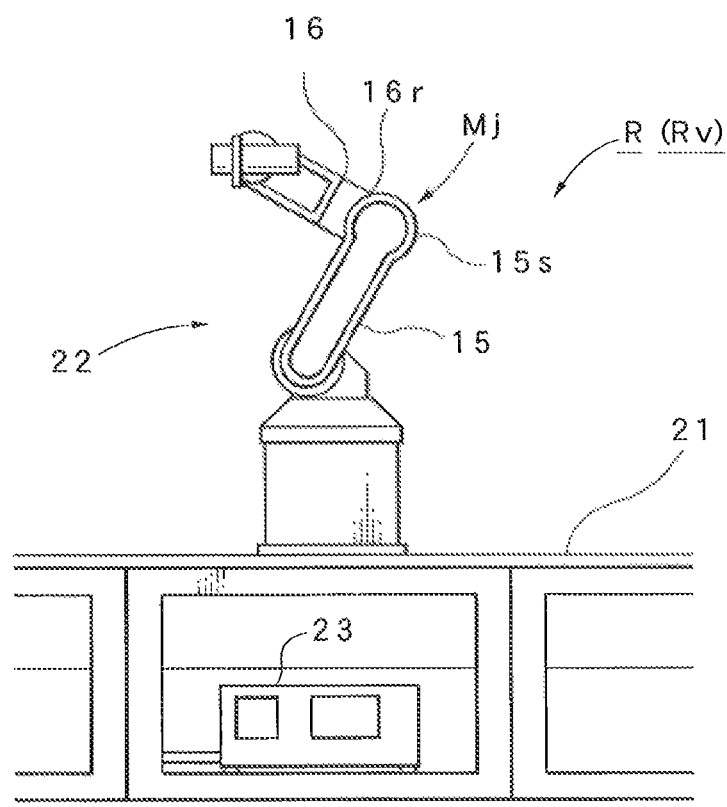
FIG. 9 illustrates the appearance of an industrial robot using the rotation deceleration transmission apparatus.
Figure 10:
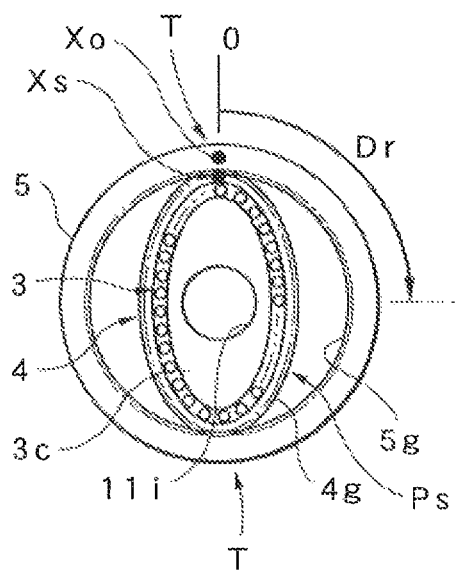
FIGS. 10(*a*)-10(*d*) illustrate the operation of the rotation deceleration transmission apparatus.
Figure 10:
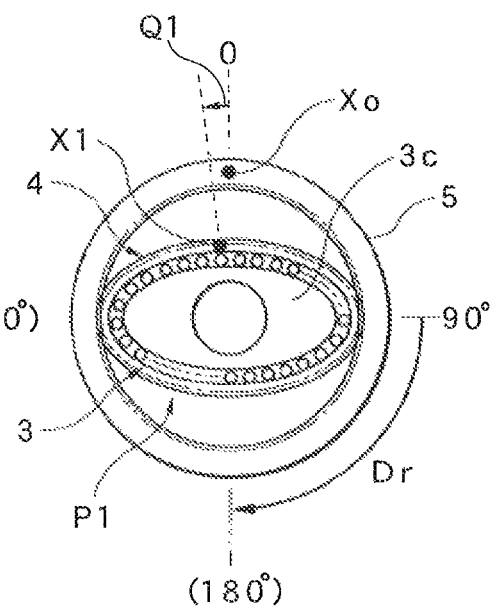
Figure 10:
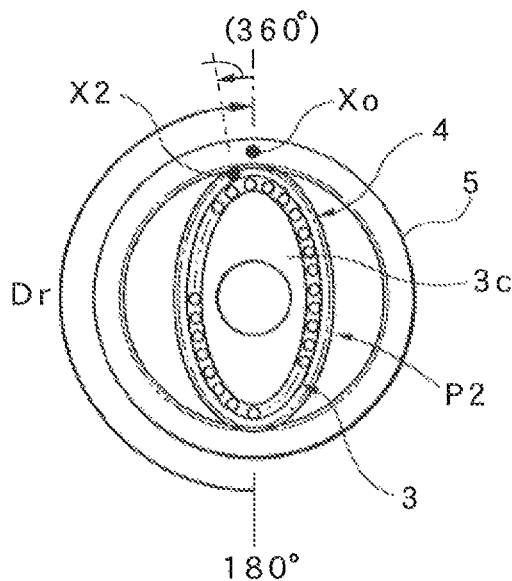
Figure 10:
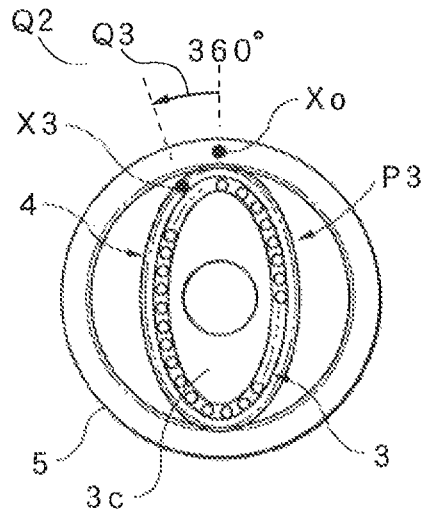

This type of the rotation deceleration transmission apparatus 100,1 can be used for a joint mechanism Mj of an industrial robot R as shown in FIG. 9. The illustrated industrial robot R is a vertical multijoint robot Rv that includes a robot body 22 provided on the upper face of a machine base 21 and a robot controller 23 stored in the lower space of the machine base 21 to control the driving of the robot body 22. The robot body 22 includes a first arm section (arbitrary arm section) 15 and a second arm section (another arm section) 16. The first arm section 15 is connected to the second arm section 16 via the joint mechanism Mj. Specifically, a tip end 15*s* of the first arm section 15 includes therein the rotation deceleration transmission apparatus 100.1. This rotation deceleration transmission apparatus 100,1 is used to drive a rear end 16*r* of the second arm section 16. This can consequently subject the second arm section 16 to a positioning control, an angle control, and a speed control for example.

Figure 1:
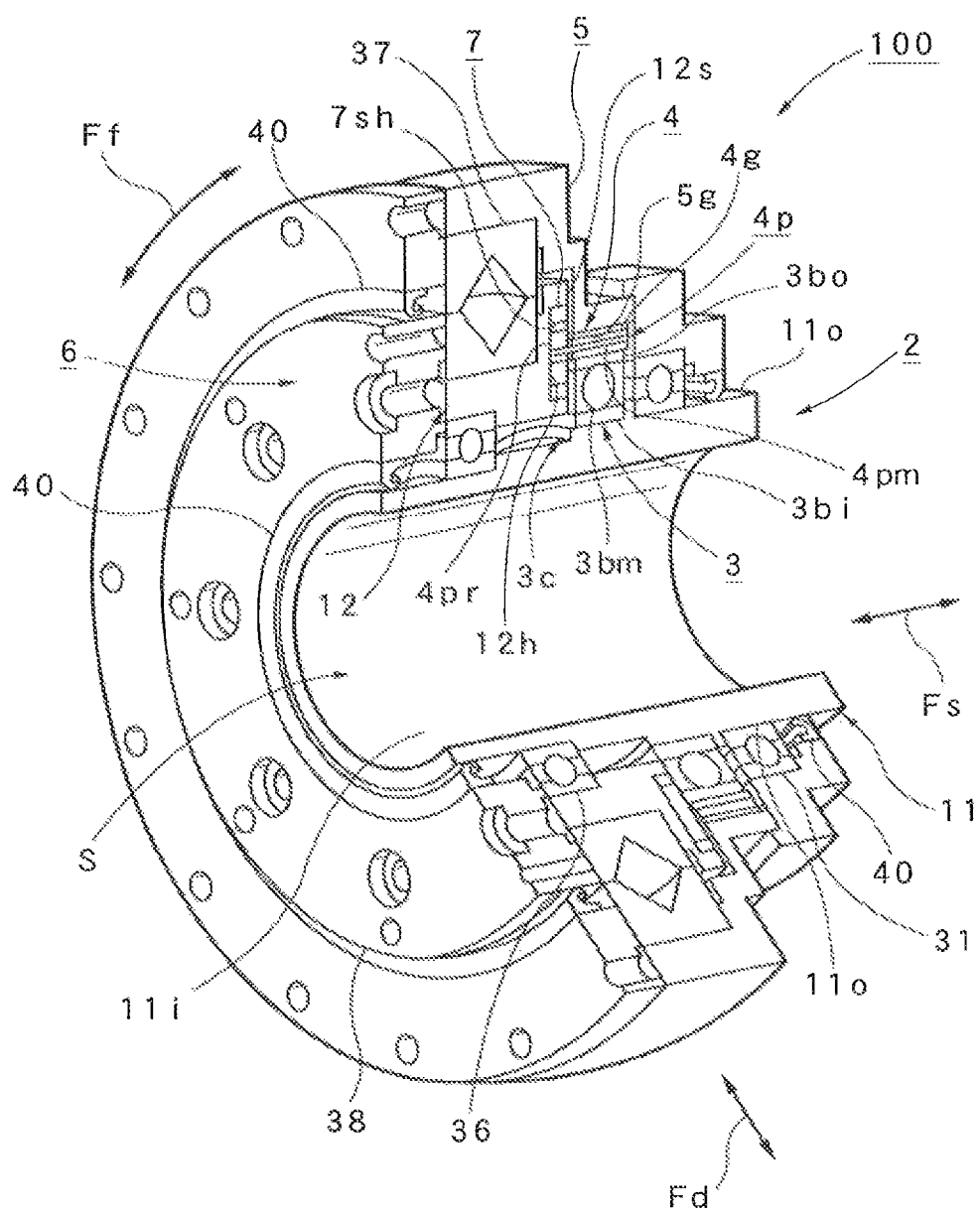
FIG. 1 is a perspective view illustrating the principle of the rotation deceleration transmission apparatus according to this invention and illustrates the entirety for which a part of the rotation deceleration transmission apparatus according to a basic embodiment is cut away.
Figure 2:
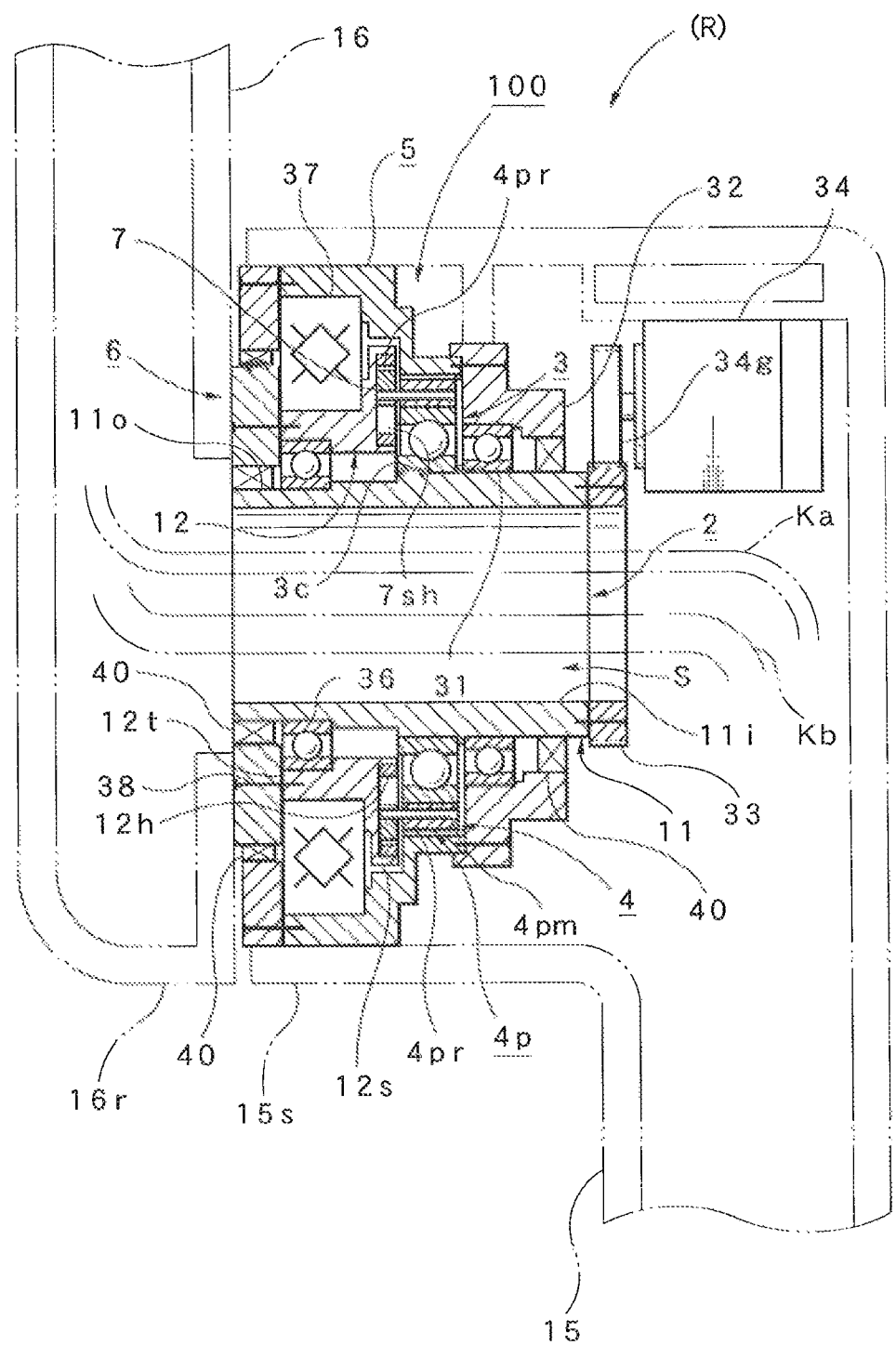
FIG. 2 is a sectional side view illustrating the entirety of the rotation deceleration transmission apparatus.

FIG. 1 and FIG. 2 illustrate the entire structure of the rotation deceleration transmission apparatus 100. In FIG. 2, the tip end 15*s* of the first arm section 15 and the rear end 16*r* of the second arm section 16 in the industrial robot R shown in FIG. 9 are shown by the virtual line, respectively. As shown in FIG. 1 and FIG. 2, the rotation deceleration transmission apparatus 100 generally includes, in an order from the upstream side of the rotation transmission direction, the rotation input section 2, the oval shaft 3, the flex gear 4, the internal gear 5, and the rotation output mechanism 6 (the output plate 7). The rotational motion inputted to the rotation input section 2 is speed-reduced to the $1/100$-$1/200$ level set in advance, and the rotational motion having a reduced speed is outputted through the rotation output mechanism 6.

The following section will specifically describe the configurations of the respective components. The rotation input section 2 is configured by the input rotation body 11 formed to have an entirely-cylindrical shape. This input rotation body 11 is supported rotatably by a bearing 31 (e.g., ball bearing). In this case, the bearing 31 has an outer ring fixed to a support pipe 32 attached to the inner face of the first arm section 15 and has an inner ring fixed to the outer periphery face of the input rotation body 11. As shown in FIG. 2, the input rotation body 11 has the interior of the inner periphery face 11$i$ functioning as the wiring space S for the cables Ka, Kb . . . . Thus, the inner diameter for example can be selected in consideration of the size of the wiring space S. The middle section of the outer periphery face 11$o$ of the input rotation body 11 in the axial direction Fs is integrated with the cam body 3$c$ configuring the oval shaft 3.

Thus, the use of the cylindrical input rotation body 11 as described above can secure the wiring space S for the cables Ka, Kb . . . to advantageously prevent, even when the number of the cables Ka, Kb . . . is increased, the entire structure including other peripheral structures from being complicated. The reference numeral 33 denotes an input gear ring fixed to the end face of the input rotation body 11.

Figure 6:
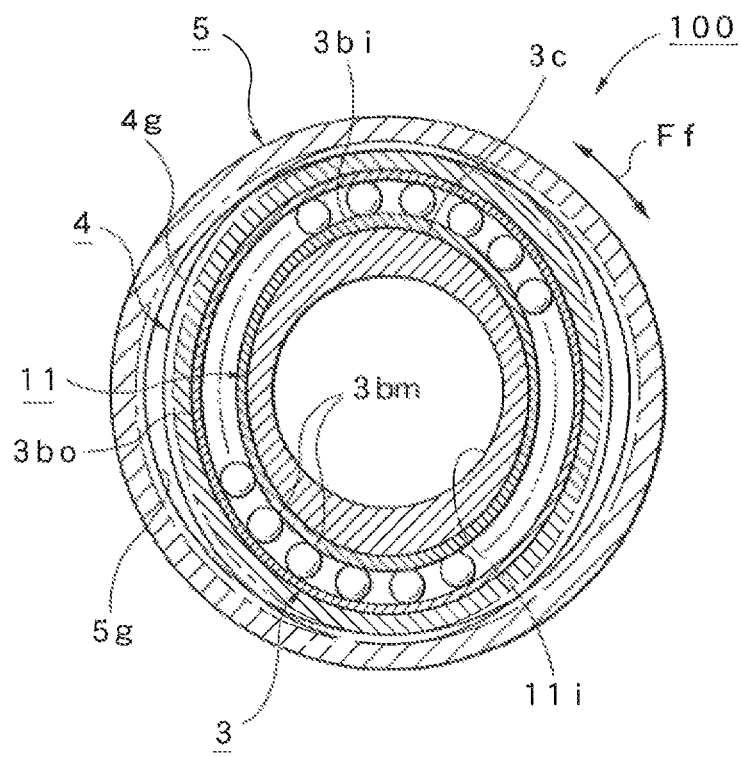
FIG. 6 is a theoretical sectional configuration view illustrating the oval shaft of the rotation deceleration transmission apparatus in a direction orthogonal to the axis.
Figure 7:
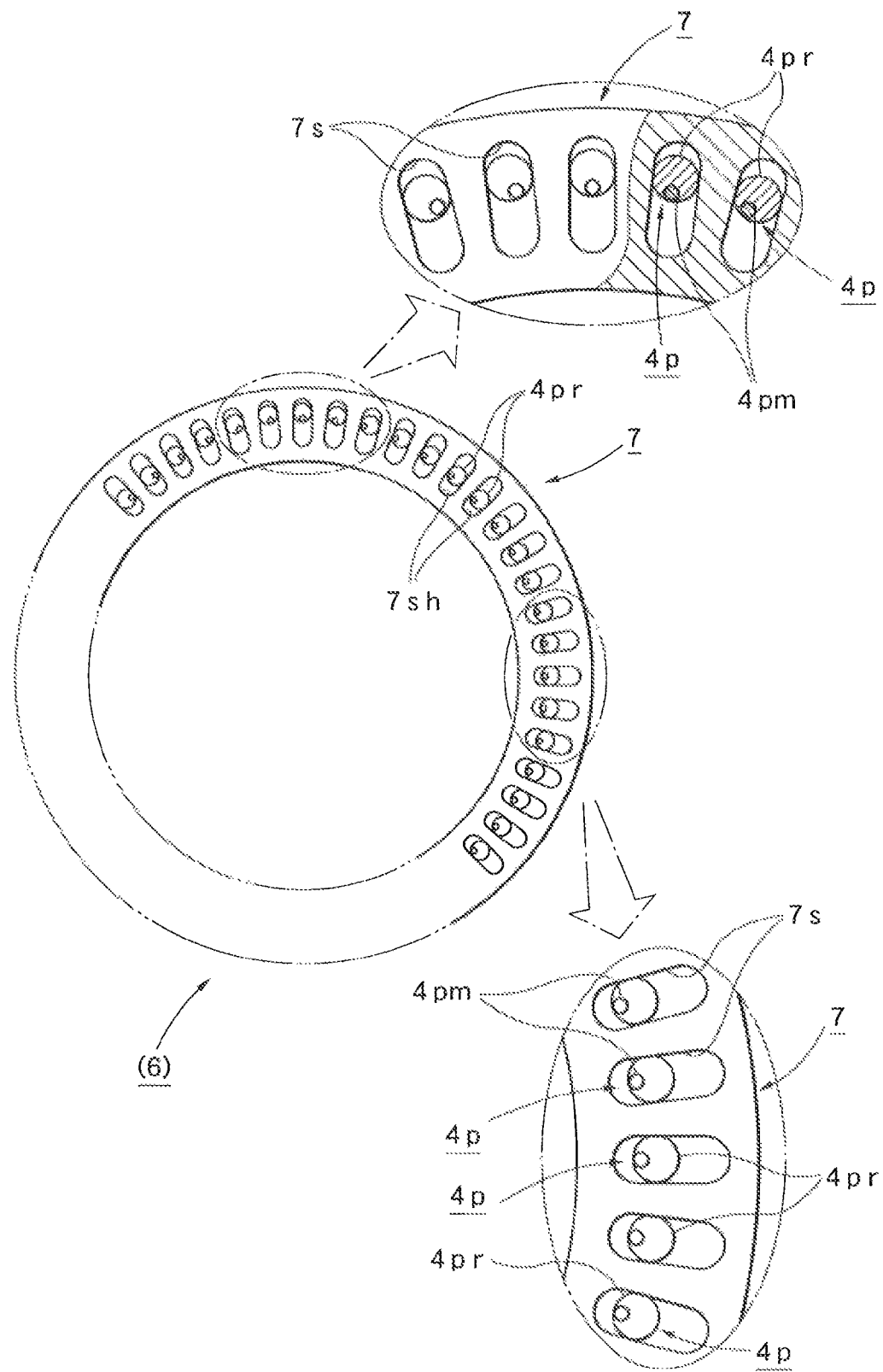
FIG. 7 is a front view including a partially-enlarged view illustrating the relation between the output plate and the transmission pin of the rotation deceleration transmission apparatus.

As shown in FIG. 6, the oval shaft 3 includes the cam body 3$c$ integrated with the input rotation body 11, the inner ring 3$bi$ provided along the outer periphery face of the cam body 3$c$, the flexible outer ring 3$bo$, and the plurality of rolling elements 3$bm$ . . . sandwiched between the inner ring 3$bi$ and the outer ring 3$bo$. The illustrated rolling element 3$bm$ . . . is a ball. The inner ring 3$bi$ can also be substituted with the outer periphery face of the cam body 3$c$. In this case, the inner periphery face 11$i$ of the cam body 3$c$ has a circular cross section in the direction orthogonal to the axial direction, and the outer periphery face 11$o$ of the cam body 3$c$ has an elliptical cross section (or oval cross section) in the direction orthogonal to the axial direction (see FIG. 6).

On the other hand, the inner face of the first arm section 15 is fixed to a drive motor 34, such as a servo motor. A driving gear 34$g$ attached to the rotation shaft of the drive motor 34 is engaged with an input gear ring 33. This allows the rotatably-supported input rotation body 11 to receive a rotational motion from the drive motor 34. As described above, the rotation input section 2 (the input rotation body 11) allowed to receive the rotational motion of the drive motor 34 allows the rotation deceleration transmission apparatus 100 to be configured as a driving section including the drive motor 34. Thus, an advantage is obtained that a driving section included in the arm section of the industrial robot can have a smaller size and the durability and reliability can be improved for example. The rotation transmission from the drive motor 34 to the rotation input section 2 was performed by the gear transmission mechanism. However, this rotation transmission may also be performed by other methods, such as a belt transmission mechanism using a timing belt and a pulley.

Figure 4:
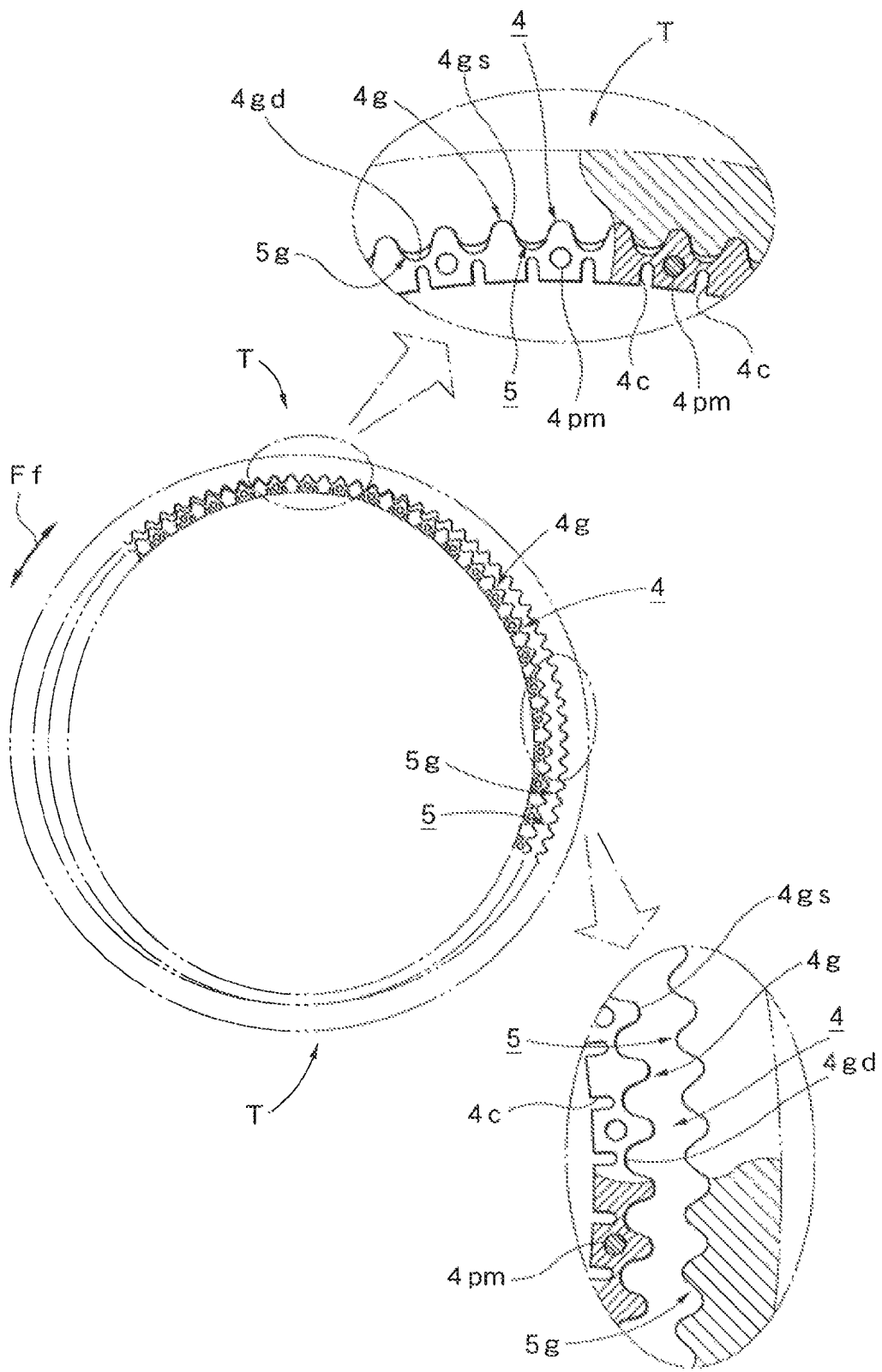
FIG. 4 is a front view including a partially-enlarged view illustrating the relation between a flex gear and an internal gear in the rotation deceleration transmission apparatus.
Figure 5:
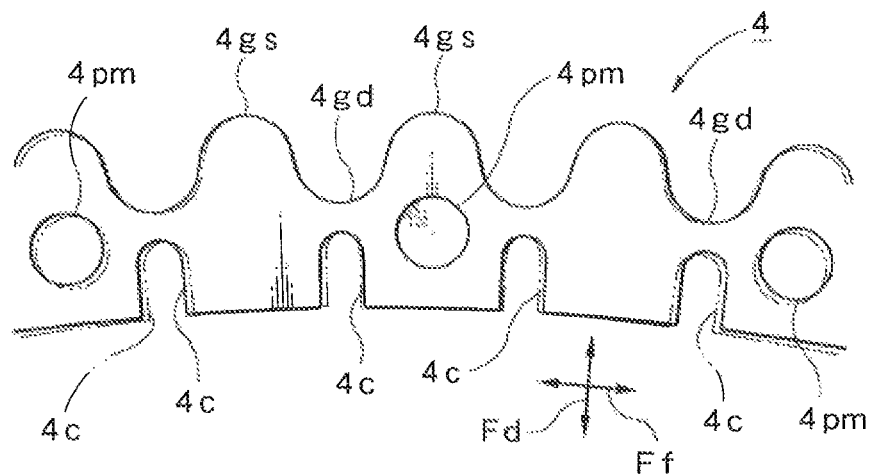
FIG. 5 illustrates a part of the flex gear of the rotation deceleration transmission apparatus and illustrates an action thereof.

The flex gear 4 is entirely configured by metal material (e.g., special steel) to have a flexible endless belt-like shape and is provided, as shown in FIG. 6, along the outer periphery face of the outer ring 3$bo$ of the oval shaft 3. FIG. 4 illustrates the entire shape of the flex gear 4. FIG. 5 is a partially-enlarged view illustrating the flex gear 4. The flex gear 4 has the outer gear 4$g$ formed on the outer periphery face along the circumferential direction Ff.

Figure 3:
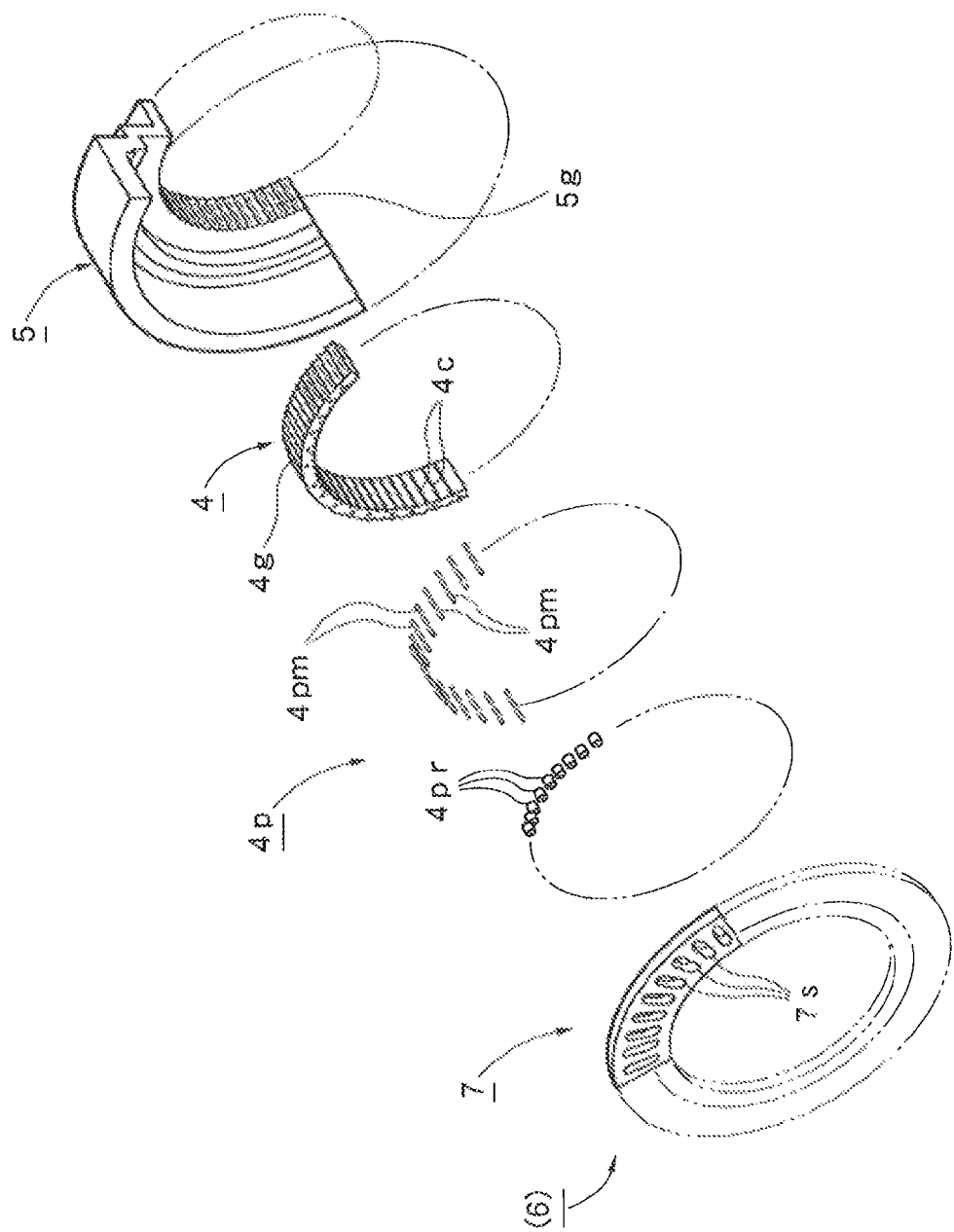
FIG. 3 is an exploded perspective view illustrating the main part of the rotation deceleration transmission apparatus.
Figure 8:
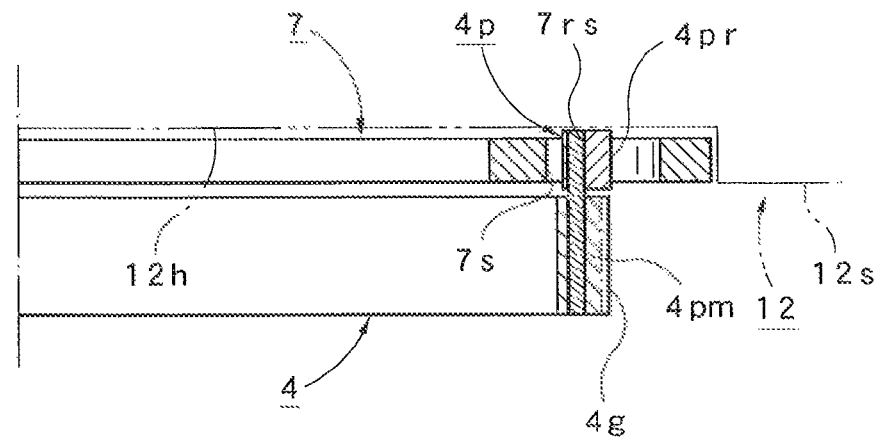
FIG. 8 is an axial sectional view illustrating a part of the main part of the rotation deceleration transmission apparatus.

Respective teeth (peak sections) 4$gs$ . . . configuring the outer gear 4$g$ have transmission pin bodies 4$pm$ . . . buried (or pressed into holes) so that every other tooth (peak section) 4$gs$ . . . has the transmission pin body 4$pm$. In this case, each teeth (peak section) 4$gs$ . . . has a function to support each transmission pin body 4$pm$ . . . and thus has the thickness and shape selected to secure the support strength. An example was shown in which every other tooth (peak section) 4$gs$ . . . has the transmission pin body 4$pm$. However, the respective transmission pin bodies 4$pm$ . . . may be provided to have an arbitrary interval thereamong. Each transmission pin body 4$pm$ . . . is formed by wear-resistant metal material having high rigidity and is formed, as shown in FIG. 3-FIG. 5, to have a round bar-like shape having a circular cross section. This round bar is configured, as shown in FIG. 8, so that one end side is buried in each teeth (peak section) 4$gs$ . . . and the other end side is allowed to protrude from the side face of the flex gear 4 in the lateral direction (or the upward direction in FIG. 8). This allows the respective transmission pin bodies 4$pm$ . . . to be arranged to have a fixed interval thereamong along the circumferential direction Ff of the flex gear 4.

The other end side of each transmission pin body 4$pm$ . . . laterally protruding from the flex gear 4 is attached to the eccentricity position of the transmission roller 4$pr$ . . . in a rotatable manner. This allows the eccentricity position of each transmission roller 4$pr$ . . . to be rotatably supported by each transmission pin body 4$pm$ . . . . In this manner, the transmission pin 4$p$ . . . is configured by the transmission pin body 4$pm$ . . . protruding from the flex gear 4 and the transmission roller 4$pr$ . . . having the eccentricity position rotatably supported around the transmission pin body 4$pm$ . . . as an axis. The transmission pin 4$p$ . . . is desirably composed of the transmission pin body 4$pm$ . . . and the transmission roller 4$pr$ . . . as described above. However, the transmission pin 4$p$ . . . may also have an integrated structure in which the transmission pin body 4$pm$ . . . has a selected shape without using the transmission roller 4$pr$ . . . .

On the other hand, the inner periphery face of the flex gear 4 has the respective positions corresponding to valleys 4$gd$ . . . among the respective teeth (peak sections) 4$gs$ . . . that have, as shown in FIG. 5, U-like-shaped notches 4$c$ . . . formed in the radiation direction Fd. This allows the thickness between each valley 4$gd$ . . . and each notch 4$c$ . . . to be flexible (or elastic) so as to be able to follow the rotation of the oval shaft 3 in a smooth and stable manner. A part shown by the solid line in FIG. 5 shows the shape of the flex gear 4 shown in FIG. 4 when the flex gear 4 is maximally away from the internal gear 5. A part shown by the virtual line in FIG. 5 shows the shape of the flex gear 4 shown in FIG. 4 when the flex gear 4 is maximally close to the internal gear 5.

The internal gear 5 is formed to have a ring-like shape entirely made of metal material to have rigidity. As shown in FIG. 3, the inner periphery face has the inner gear 5$g$ formed along the circumferential direction Ff. As shown in FIG. 2, the outer periphery face of the internal gear 5 is fixedly attached to the inner face of the first arm section 15 and the inner gear 5$g$ is engaged with the outer gear 4$g$ of the flex gear 4 described above. The teeth number of the inner gear 5$g$ of the internal gear 5 is set to be higher than the teeth number of the outer gear 4$g$ of the flex gear 4. In the case of the illustration, the outer gear 4$g$ has the teeth number set to "N" and the inner gear 5$g$ has the teeth number set to "N+2".

In this case, the outer periphery of the flex gear 4 has an elliptical shape. Thus, the flex gear 4 is engaged at the two engagement positions T, T having the positional relation of 180[°] to the inner gear 5$g$. By engaging the flex gear 4 at the two engagement positions T, T having the positional relation of 180[°] to the inner gear 5$g$ as described above, the flex gear 4 can have the simplest elliptical shape. This shape can require an accuracy lower than that required when the flex gear 4 is engaged at three or more engagement positions T . . . for example. Thus, an advantage is obtained that the manufacture and machining can be performed in an easier manner, and the durability, noise reduction, and reliability can be improved.

The rotation output mechanism 6 includes a ring-like-shaped output plate retainer 12. The output plate retainer 12 is configured so that the inner periphery face side is supported by a bearing (roller bearing) 36 provided between this inner periphery face and the outer periphery face of the input rotation body 11, and the outer periphery face is supported by a cross roller bearing 37 provided between the outer periphery face of this output plate retainer 12 and the inner face of the first arm section 15. An end face 12s of the output plate retainer 12 is opposed to the flex gear 4 and has a ring concave section 12h mated with the output plate 7. This ring concave section 12h is mated with the output plate 7 shown in FIG. 2. On the other hand, an output connection plate 38 is fixed to an end face 12t provided at an opposite side of the end face 12s having the ring concave section 12h of the output plate retainer 12.

The output plate 7 is formed to have a ring-like shape (or a ring plate-like shape) and has a plurality of engagement holes 7sh . . . that can be engaged with the transmission rollers 4pr . . . . The engagement holes 7sh . . . are formed in the circumferential direction Ff of the output plate 7 to have a predetermined interval thereamong and are formed as slit-like long holes that allow the displacement of the transmission rollers 4pr . . . during the rotation of the output plate 7. The output plate 7 formed to have a ring-like shape can advantageously provide the wiring space for the cables Ka, Kb . . . and can be combined with the cylindrically-shaped input rotation body 11 in particular to thereby allow the entire structure to have simplicity and high rigidity. In FIG. 1 and FIG. 2, the reference numeral 40 . . . shows a seal ring.

As described above, the rotation output mechanism 6 is configured by the transmission roller 4pr . . . , having the eccentricity position supported at the transmission pin body 4pm . . . as an axis and the ring-like-shaped output plate 7 that is engaged with the transmission roller 4pr . . . and that has a plurality of the engagement holes 7sh . . . provided in the radiation direction Fd and formed in the circumferential direction Ff to have a predetermined interval thereamong to allow the displacement of the transmissions roller 4pr . . . during the rotation transmission. This can effectively absorb the displacement of the transmission pins 4p . . . relative to the engagement holes 7sh . . . caused at different positions in the circumferential direction Ff. This can exclude the unnecessary stress caused when the engagement hole 7sh . . . is directly engaged with the transmission pin body 4pm . . . and can provide the rotation transmission from the transmission pin 4p . . . to the rotation output mechanism 6 in a smooth and stable manner and can exclude an unnecessary loss to thereby improve the rotation transmission efficiency.

Thus, the rotation deceleration transmission apparatus 100 of the basic embodiment includes: the rotation input section 2 that receives a rotational motion; the oval shaft 3 configured so that the plurality of rolling elements 3bm . . . are provided between the cam body 3c rotating with this rotation input section 2 in an integrated manner and the inner ring 3bi and the flexible outer ring 3bo provided along the outer periphery of the cam body 3c; the internal gear 5 having the inner gear 5g formed at the inner periphery and having a fixed position; the flex gear 4 having the outer gear 4g that is formed in the circumferential direction Ff of the outer periphery and that has a smaller teeth number than that of the inner gear 5g so that, when outer gears 4g are provided at the outer periphery of the oval shaft 3, the outer gear 4g is engaged with the inner gear 5g at two engagement positions T . . . (or generally a plurality of positions) in the circumferential direction Ff and the flex gear 4 has a plurality of the transmission pin bodies 4pm . . . that protrude from the side face and that are provided in the circumferential direction Ff to have a predetermined interval thereamong and the transmission pin 4p . . . configured by the transmission roller 4pr . . . having an eccentricity position rotatably supported around this the transmission pin body 4pm . . . as an axis; and the rotation output mechanism 6 having the output plate 7 including a plurality of the engagement holes 7sh . . . that are engaged with the transmission pins 4p . . . and that are provided along the circumferential direction Ff with a predetermined interval to allow the displacement of the transmission pins 4p . . . during the rotation transmission, thus eliminating the need for the conventional flexspline having an entirely cup-like shape using a thin-walled metal elastic plate member.

Thus, the manufacture can be achieved easily, the manufacture cost can be significantly reduced, and the metal fatigue and malfunctioning for example can also be significantly reduced. Thus, the durability and the reliability can be improved, thus providing a significant reduction in the initial cost and the running cost. Furthermore, the elimination of the need for the conventional flexspline can provide the reduction of the layout space in the axial direction Fs. Thus, the entire structure can have a thinner thickness, thus easily achieving the further downsizing of, in particular, industrial robots for which the downsizing has been limited for example.

When the rotation deceleration transmission apparatus 100 is used in the joint mechanism Mj to connect an arbitrary arm section 15 and another arm section 16 configuring the robot R, the joint mechanism Mj can have a thinner thickness (or a smaller size) and can have improved durability and reliability. Thus, an industrial robot (e.g., vertical multijoint robot Rv, horizontal multijoint robot, delta-type robot) optimally provided in a production line in particular can be advantageously structured.

Next, the following section will describe the operation of the rotation deceleration transmission apparatus 100 having the basic embodiment as described above with reference to FIG. 1-FIG. 9 and mainly based on FIG. 10(a)-FIG. 10(d). FIG. 10(a)-FIG. 10(d) illustrate the principle and thus show the cam body 3c having an elliptical shape drawn to have an exaggerated elongated shape.

First, when the robot controller 23 controls the drive motor 34 to be ON, the drive motor 34 is activated to rotate the driving gear 34g. This rotational motion is transmitted to the input gear ring 33 and is further transmitted to the input rotation body 11 including the cam body 3c, thus allowing the cam body 3c to rotate at a relatively-high speed.

FIG. 10(a) illustrates a status prior to the start of the rotation of the cam body 3c. In this status, the cam body 3c is stopped at a position Ps and the cam body 3c has a longitudinal direction (a direction in which the elliptical shape has the maximum diameter) in the up-and-down direction. Thus, the starting point in the flex gear 4 is provided at a position shown by the reference numeral Xs and corresponds to a reference point Xo of the internal gear 5. In the status of FIG. 10(a), the outer gear 4g of the flex gear 4 is engaged with the inner gear 5g of the internal gear 5 at the two engagement positions T, T provided in the up-and-down direction.

Next, a status is assumed in which the cam body 3c is rotated by 90° in the direction shown by the arrow Dr from the position Ps of FIG. 10(a). This status is shown in FIG. 10(b). In this case, the cam body 3c is displaced to the position P1 obtained by rotating the cam body 3c by 90° from the position Ps in the clockwise direction. As a result, the cam body 3c has a longitudinal direction set in the left-and-right direction as shown in FIG. 10(b). Thus, during the rotation of the cam body 3c, an upper engagement position T (or a lower engagement position T) at which the outer gear 4g is engaged with the inner gear 5g is moved by 90° in the clockwise direction. The outer gear 4g has the teeth number N and the inner gear 5g has the teeth number N+2. Thus, the starting point of the flex gear 4 is displaced relative to the reference point Xo by the angle Q1=(360°/N)×2)/4 to move to a position X1 in the counterclockwise direction.

A status is assumed in which the cam body 3c is further rotated by 90° from the position P1 of FIG. 10(b) in the direction shown by the arrow Dr. This status is shown in FIG. 10(c). In this case, the cam body 3c is displaced to the position P2 by being rotated by 90° from position P1 in the clockwise direction. Thus, the longitudinal direction of the cam body 3c is in the up-and-down direction as shown in FIG. 10(c). Thus, the starting point of the flex gear 4 is displaced by the angle Q2=(360°/N)×2)/2 to a position X2 in the counterclockwise direction relative to the reference point Xo.

Next, a status is assumed in which the cam body 3c is rotated by 180° from the status of FIG. 10(c) in the direction shown by the arrow Dr. This status is shown in FIG. 10(d). In this case, the cam body 3c is displaced from the position P2 to the position P3 by being rotated by 180°. This allows the cam body 3c to have a longitudinal direction in the up-and-down direction inverted relative to the position of FIG. 10(c). Thus, the flex gear 4 has a starting point displaced to a position X3 by being rotated relative to the reference point Xo by the angle Q3=(360°/N)×2) in the counterclockwise direction. As described above, one rotation of the cam body 3c is performed in the clockwise direction, and the flex gear 4 is moved by the teeth number "2" in the counterclockwise direction, thereby performing the reduction processing.

Furthermore, the decelerated rotational motion of the flex gear 4 is transmitted to the rotation output mechanism 6. Specifically, the transmission pin 4p . . . protruding from the flex gear 4 includes the transmission roller 4pr . . . for which the eccentricity position engaged with the engagement hole 7sh . . . of the output plate 7 is supported. This allows the output plate 7 to be rotated while being completely synchronized with the rotational motion of the flex gear 4. In this case, the transmission pin 4p . . . is displaced in a reciprocated manner in a radiation direction Dd in accordance with the trajectory of the outer periphery face of the cam body 3c. However, this displacement is absorbed by the engagement hole 7sh . . . formed by the long hole.

As shown in FIG. 2, the rotational motion of the output plate 7 is caused to have a reduced speed relative to the inputted rotational motion. The resultant rotational motion is transmitted, to the second arm section 16, via the rotation output mechanism 6, except for the output plate 7 including the output plate retainer 12 and the output connection plate 38, thereby causing the second arm section 16 to be rotated and displaced. Specifically, the rotation is accurately controlled by the first arm section 15 as a supporting point.

Figure 13:
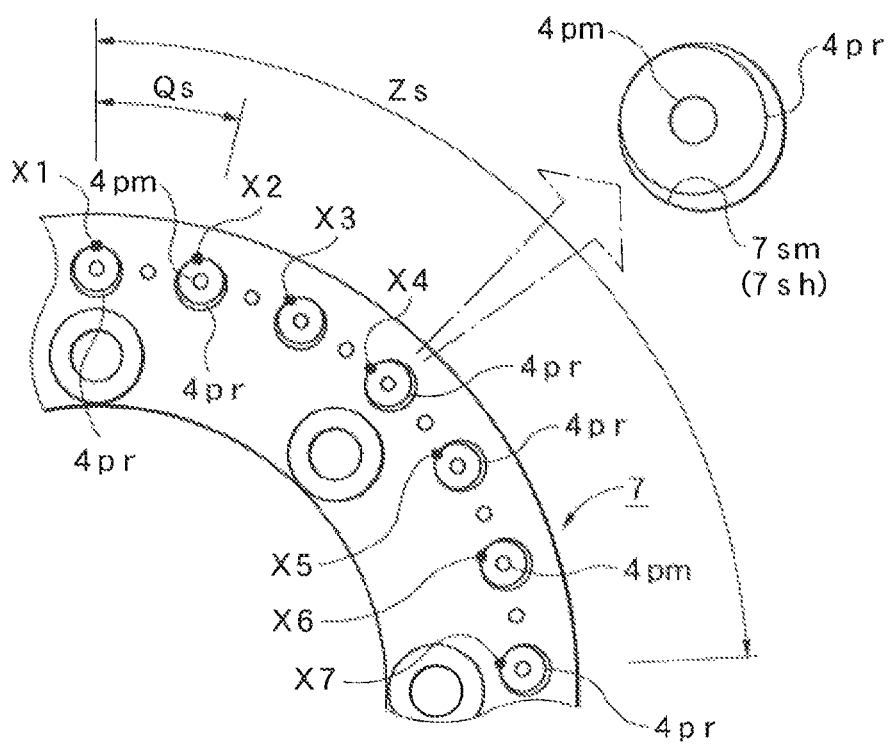
FIG. 13 illustrates the operation of the output plate and illustrates how the transmission pin of output plate is engaged.
Figure 14:
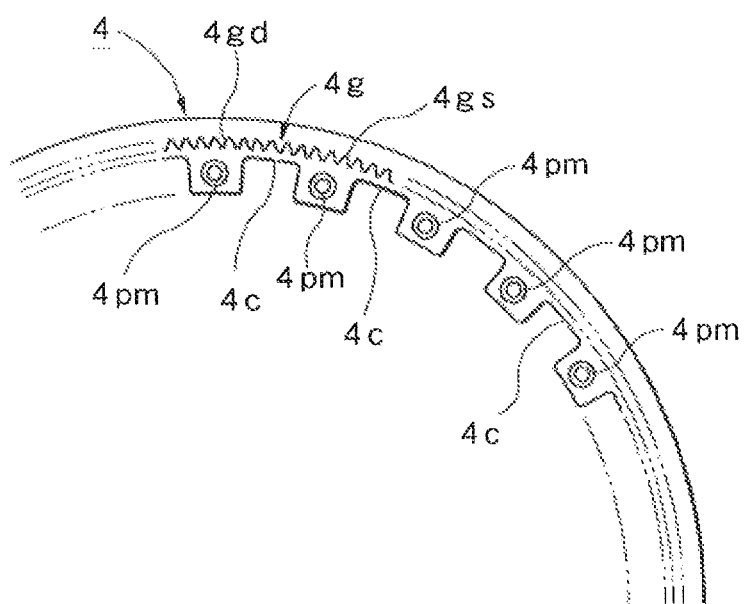
FIG. 14 is a front view illustrating only a part of the flex gear of the rotation deceleration transmission apparatus.
Figure 15:
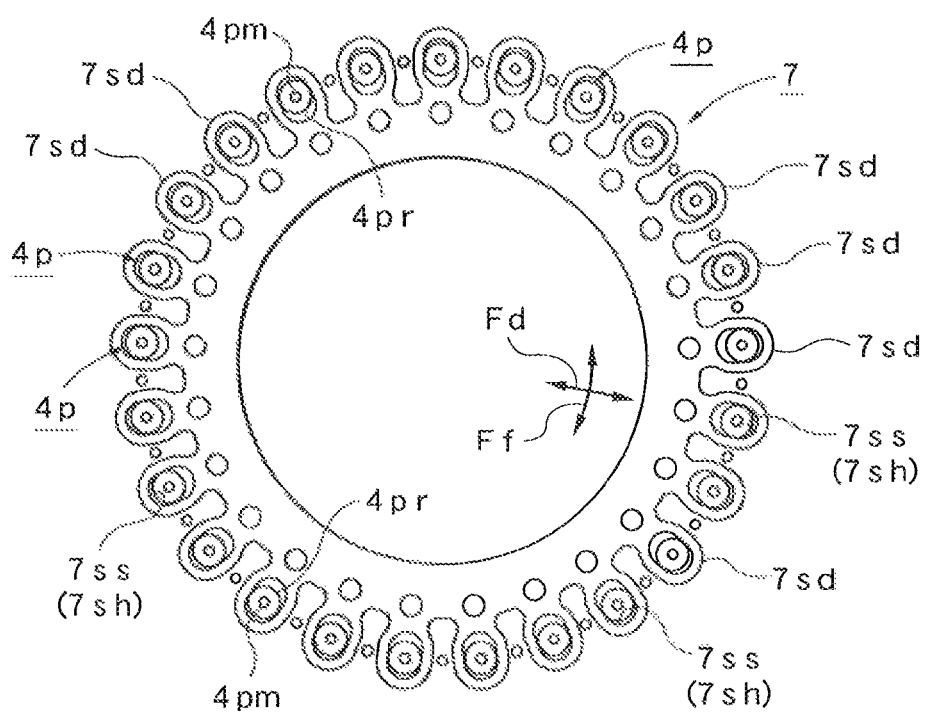
FIG. 15 is a front view of the output plate illustrating how the transmission pin of the rotation deceleration transmission apparatus according to another preferred embodiment (the second embodiment) of this invention is engaged.
Figure 16:
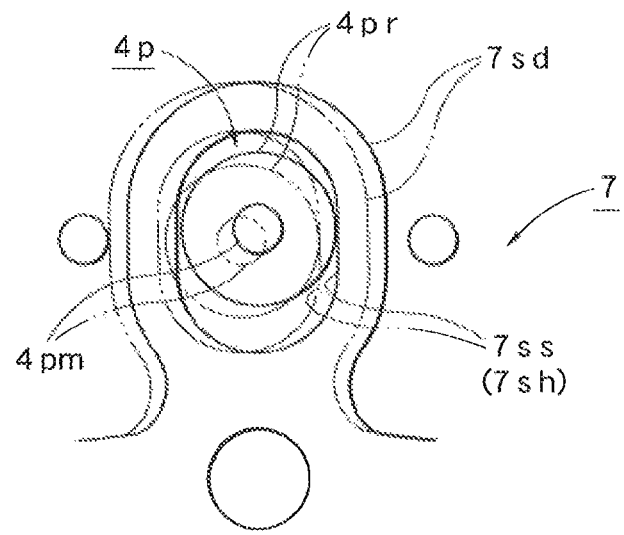
FIG. 16 illustrates the action of the output plate and illustrates how the transmission pin of the rotation deceleration transmission apparatus is engaged.
Figure 17:
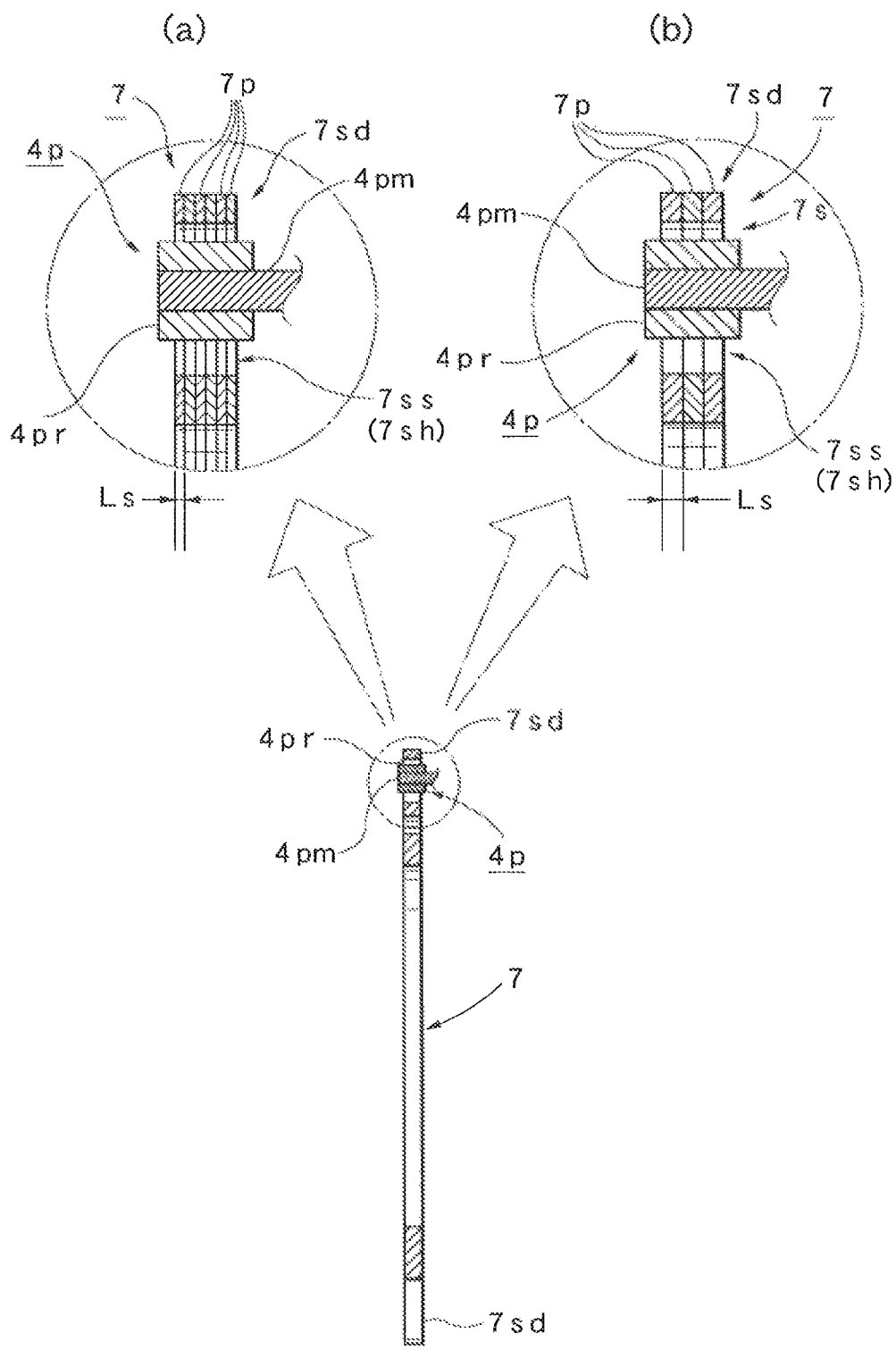
FIG. 17 is a sectional side view of the output plate including a partially-enlarged view illustrating how the transmission pin of the rotation deceleration transmission apparatus is engaged.

Next, in view of the basic embodiment as described above, the following section will describe in detail the rotation deceleration transmission apparatus 1 according to a preferred embodiment of this invention with reference to FIG. 11-FIG. 17. FIG. 11-FIG. 14 illustrate the first embodiment of the rotation deceleration transmission apparatus 1. FIG. 15-FIG. 17 illustrate the second embodiment of the rotation deceleration transmission apparatus 1.

First Embodiment

First, the following section will describe the rotation deceleration transmission apparatus 1 according to the first embodiment with reference to FIG. 11-FIG. 14.

The first embodiment is different from the above-described basic embodiment in that the transmission pin 4p . . . and the output plate 7 in particular are changed. Specifically, the first embodiment has basic configurations as shown in FIG. 11-FIG. 14 similar to the basic embodiment in that the flex gear 4 is provided that has the plurality of transmission pins 4p . . . protruding from the side face and being provided in the circumferential direction Ff with a predetermined interval thereamong, and the output plate 7 is provided that has the engagement sections 7s . . . having the engagement holes 7sh . . . engaged with the respective transmission pins 4p . . . and being provided along the circumferential direction Ff with a predetermined interval to allow the displacement of the transmission pin 4p . . . during the rotation transmission. However, the first embodiment is different from the basic embodiment in the following points.

Firstly, the transmission pin 4p is configured in the basic embodiment so that the transmission pin body 4pm is used to support the eccentricity position of the transmission roller 4pr. In the first embodiment, the transmission pin 4p is configured by a transmission pin body 4pm protruding from the flex gear 4 and a transmission roller 4pr having a center position rotatably supported by this transmission pin body 4pm as an axis. Thus, the transmission pin 4p . . . can be engaged with the engagement hole 7sh . . . while reducing the contact friction between the transmission pin 4p . . . and the engagement hole 7sh . . . . Thus, the rotation transmission from the flex gear 4 to the output plate 7 can be performed in an efficient and stable manner and the unnecessary heat generation and abrasion can be excluded to improve the long-term use reliability, as in the basic embodiment.

Figure 11:
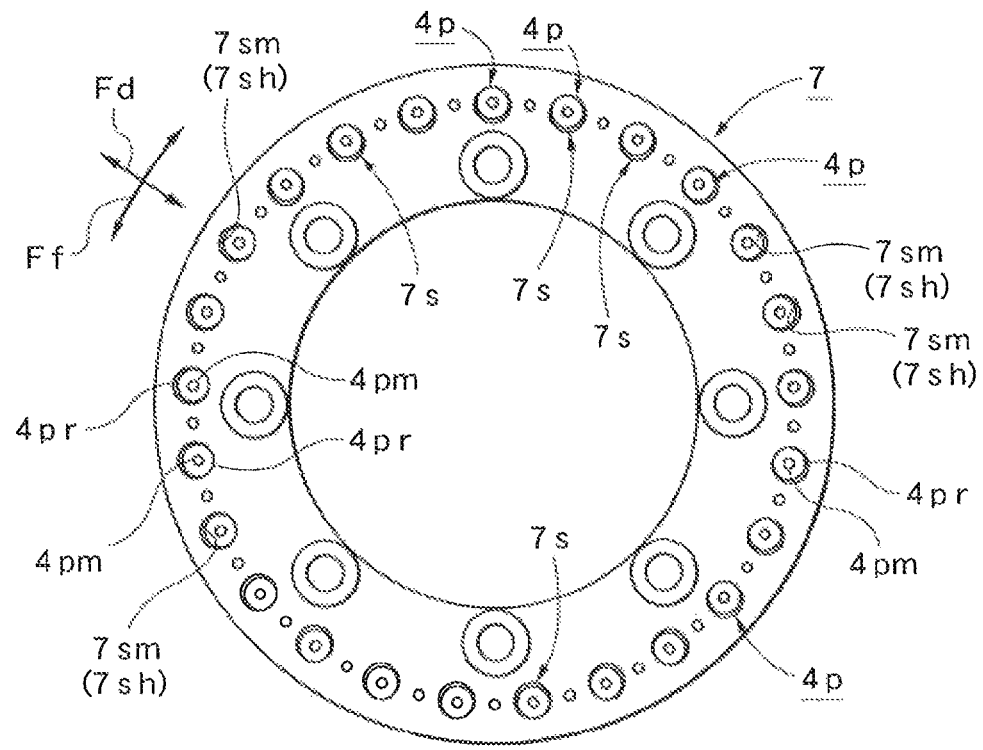
FIG. 11 is a front view of the output plate illustrating how the transmission pin of the rotation deceleration transmission apparatus according to a preferred embodiment of this invention (the first embodiment) is engaged.
Figure 12:
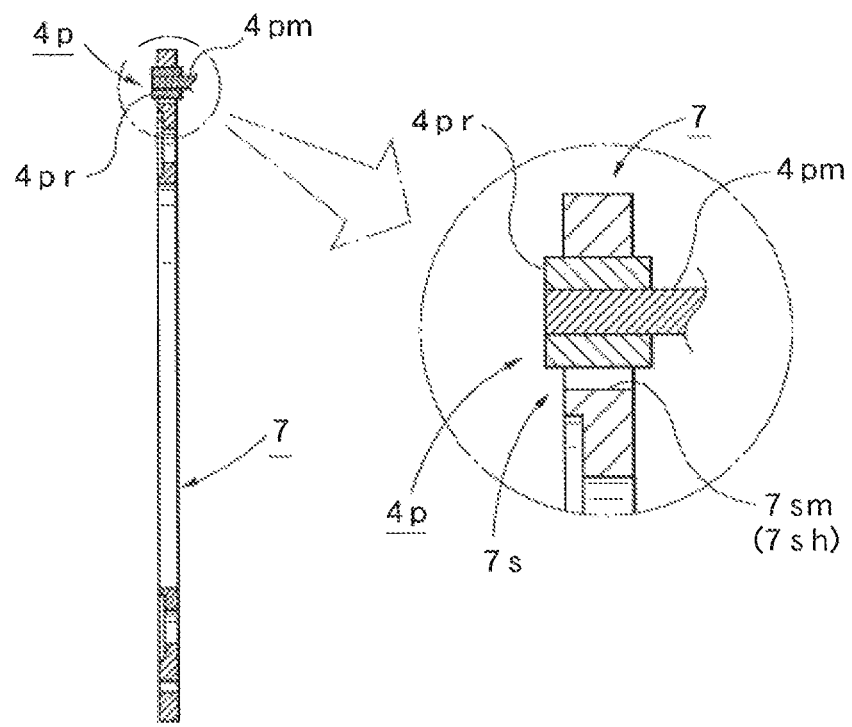
FIG. 12 is a sectional side view of the output plate including a partially-enlarged view and illustrates how the transmission pin of the rotation deceleration transmission apparatus is engaged.

Secondly, a plurality of the engagement holes 7sh . . . are formed along the circumferential direction Ff of the ring plate-like output plate 7 to have a predetermined interval thereamong. In the basic embodiment, the engagement holes 7sh . . . are formed as slit-like long holes so as to be able to allow the displacement of the transmission roller 4pr . . . during the rotation of the output plate 7. In the first embodiment on the other hand, as shown in FIG. 11-FIG. 13, the multidirectional engagement hole 7sm . . . is formed that is always abutted to the peripheral surface of the transmission pin 4p . . . (the peripheral surface of the transmission roller 4pr . . . ) and that allows and the displacement of the transmission pin 4p . . . in the circumferential direction Ff and the radiation direction Fd of the output plate 7.

Specifically, as shown in FIG. 13, the respective multidirectional engagement holes 7sm . . . are formed along the circumferential direction Ff of the output plate 7 to have an interval of Qs[°] (or 14.4[°]) thereamong. Thus, a range Zs corresponding to about ¼ of the circumference for example has seven multidirectional engagement holes 7sm . . . . Thus, as shown in FIG. 13, the multidirectional engagement hole Ism positioned at the highest portion has the transmission roller 4pr having an upper end position abutted at the abutting position X1 at an upper end of the inner face of the multidirectional engagement hole 7sm. If the output plate 7 is rotated in the clockwise direction, the cam body 3c is rotated by Qs[°] to allow the transmission roller 4*pr* to be abutted to the multidirectional engagement hole Ism at the abutting position X2 having an angle displaced from the transmission roller 4*pr* by Qs[°] in the counterclockwise direction. Similarly, the cam body 3*c* is rotated by Qs[°]×2 to allow the transmission roller 4*pr* to be abutted to the multidirectional engagement hole Ism at the abutting position X3 displaced by Qs[°]×2 from the transmission roller 4*pr* in the counterclockwise direction. The cam body 3*c* is further rotated by Qs[°]×3 to allow the transmission roller 4*pr* to be abutted to the multidirectional engagement hole Ism at an abutting position X4 displaced by Qs[°]×3 from the transmission roller 4*pr* in the counterclockwise direction. The cam body 3*c* is rotated by Qs[°]×6 to allow the transmission roller 4*pr* to be abutted to the multidirectional engagement hole Ism at the abutting position X7 displaced by Qs[°]×6 from the transmission roller 4*pr* in the counterclockwise direction by about ¼ of the circumference. The reference numerals X5 and X6 also show the abutting positions in the middle of the rotation.

Thus, the multidirectional engagement hole Ism may have such a shape that allows, at any position in the 360[°] range within which the cam body 3*c* is rotated, the outer periphery face of the transmission roller 4*pr* to be always abutted to the inner periphery face of the multidirectional engagement hole Ism by a uniform pressure in particular. Thus, the multidirectional engagement hole Ism must be formed with a high machining accuracy (shape accuracy). This shape can absorb, by the so-called cam method, the displacement caused at a different position in the circumferential direction Ff of the transmission pin 4*p* . . . from the engagement hole 7*sh* . . . in the circumferential direction Ff and the radiation direction Fd. This can provide an advantage that the unnecessary stress caused when the engagement hole 7*sh* . . . is engaged with the transmission pin 4*p* . . . is excluded, the rotation transmission from the transmission pin 4*p* . . . to the output plate 7 can be performed in a stable and smooth manner, and an accurate rotation transmission by an increased rigidity in particular can be performed.

FIG. 14 illustrates the flex gear 4 used in the first embodiment. FIG. 14 shows a modification example different from the basic embodiment in that each notch 4*c* . . . has a wider shape and the respective notches 4*c* . . . have therebetween each transmission pin body 4*pm* . . . . In FIG. 11-FIG. 14, the same parts as those of FIG. 1-FIG. 10 are denoted with the same reference numerals to clarify the configurations, and the detailed description will not be further provided.

Second Embodiment

Next, the following section will describe the rotation deceleration transmission apparatus 1 according to the second embodiment with reference to FIG. 15-FIG. 17.

The second embodiment is a modification of the output plate 7 in the above-described first embodiment. The second embodiment has the basic configuration as that of the first embodiment as shown in FIG. 15-FIG. 17 in that the output plate 7 has the engagement section 7*s* . . . including the engagement holes 7*sh* . . . that are engaged with the respective transmission pins 4*p* . . . and that are provided along the circumferential direction Ff to have a predetermined interval thereamong to allow the displacement of the transmission pin 4*p* . . . during the rotation transmission. The second embodiment is different from the first embodiment in the following point.

Specifically, the output plate 7 of the second embodiment has the engagement section 7*s* . . . that protrudes from the output plate 7 in the radiation direction Fd, that is always abutted to the peripheral surface of the transmission pin 4*p* . . . , and that allows the displacement of the transmission pin 4*p* . . . in the radiation direction Fd, thereby providing the elastic displacement of the elastic engagement section 7*sd* . . . in the circumferential direction Ff.

Thus, the output plate 7 is configured, as shown in FIG. 17, by layering the plurality of spring plate members 7*p* . . . in the axial direction Fs to have a predetermined thickness Ls. FIG. 17(*a*) shows an example in which five spring plate members 7*p* . . . are layered. FIG. 17(*b*) illustrates an illustrative cross section of three layered spring plate members 7*p* . . . . In this manner, the output plate 7 can be configured by layering the plurality of spring plate members 7*p* . . . having the predetermined thickness Ls in the axial direction Fs. This configuration provides an advantage that can secure, even when the output plate 7 has a thick thickness, appropriate elasticity, thus providing an accurate rotation transmission from the transmission pin 4*p* . . . to the output plate 7 (the rotation output mechanism 6).

The configuration of the second embodiment can absorb, by the so-called elastic method, the displacement of the transmission pin 4*p* . . . from the engagement hole 7*sh* . . . caused at a different position in the circumferential direction Ff in the circumferential direction Ff in particular. The elastic engagement section 7*sd* shown by the solid line in FIG. 16 shows the elastic engagement section 7*sd* positioned at the highest portion of FIG. 15. The elastic engagement section 7*sd* shown by the virtual line in FIG. 16 shows the elastic engagement section 7*sd* at a position rotated by about ¼ of the circumference from the highest portion. As described above, the displacement of the transmission pin 4*p* . . . in the radiation direction Fd is allowed by the guide of the one-direction engagement hole 7*ss* . . . . The displacement of the transmission pin 4*p* . . . in the circumferential direction Ff is allowed by the elastic displacement of the elastic engagement section 7*sd* . . . . Thus, the configuration according to the second embodiment can also exclude the unnecessary stress caused when the engagement hole 7*sh* . . . is engaged with the transmission pin 4*p* . . . , can provide the rotation transmission from the transmission pin 4*p* . . . to the output plate 7 (the rotation output mechanism 6) in a stable and smooth manner, and does not require a high machining accuracy, thus providing an easy and low-cost implementation.

The second embodiment can also use the flex gear 4 shown in FIG. 14 in the first embodiment. The transmission pin 4*p* . . . in the second embodiment can also have the same configuration as that of the first embodiment. In FIG. 11-FIG. 14, the same parts as those of FIG. 1-FIG. 10 are denoted with the same reference numerals to clarify the configurations, and the detailed description will not be further provided.

Thus, the rotation deceleration transmission apparatus 1 according to the second embodiment can provide the same effect as that of the rotation deceleration transmission apparatus 100 according to the above-described basic embodiment because the basic configuration in particular includes: a rotation input section 2 for receiving rotational motion; an oval shaft 3 that includes a cam body 3*c* rotating with this rotation input section 2 in an integrated manner and a plurality of rolling elements 3*bm* . . . that are sandwiched between an inner ring 3*bi* provided along the outer periphery of the cam body 3*c* and a flexible outer ring 3*bo*; an internal gear 5 having an inner gear 5*g* at the inner periphery and having a fixed position; a flex gear 4 having outer gears 4g that are formed along the circumferential direction Ff of the outer periphery and that have a reduced teeth number relative to the inner gears 5g so that, when the outer gears 4g are provided at the outer periphery of the oval shaft 3, the outer gears 4g are engaged with the inner gears 5g at a plurality of engagement positions T . . . in the circumferential direction Ff, the flex gear 4 has a plurality of transmission pins 4p . . . that protrude from a side face and that are provided along the circumferential direction Ff to have a predetermined interval thereamong; and a rotation output mechanism 6 having an output plate 7 having an engagement section 7s . . . including an engagement hole 7sh . . . that is engaged with each transmission pin 4p . . . and that is provided along the circumferential direction Ff with a predetermined interval to allow the displacement of the transmission pin 4p . . . in the circumferential direction Ff and/or the radiation direction Fd during the rotation transmission.

Specifically, this configuration eliminates the need for a conventional flexspline having an entirely cup-like shape using a thin-walled metal elastic plate member. Thus, the manufacture can be achieved easily, the manufacture cost can be significantly reduced, and the metal fatigue and malfunctioning for example can also be significantly reduced. Thus, the durability and the reliability can be improved, thus providing a significant reduction in the initial cost and the running cost. The elimination of the need for the conventional flexspline can provide a smaller layout space in the axial direction Fs. Thus, the entire structure can have a thinner thickness, thus easily achieving the further downsizing of, in particular, industrial robots for which the downsizing has been limited for example.

As described above, the preferred embodiments (the first embodiment and the second embodiment) have been described in detail. However, this invention is not limited to such embodiments. Detailed configuration, shape, material, quantity, or value for example may be changed, added, or deleted within a scope not deviating from the summary of this invention.

For example, a case was shown in which the transmission pin 4p . . . is composed of the transmission pin body 4pm . . . protruding from the flex gear 4 and the transmission roller 4pr . . . having a center position rotatably supported around the transmission pin body 4pm . . . as an axis. However, the shape the transmission pin body 4pm . . . may also be selected without using the transmission roller 4p . . . to provide an integrated transmission pin 4p . . . . A case was described in which the output plate 7 is formed to have a ring-like shape, and the rotation input section 2 is configured by the cylindrical input rotation body 11. However, when the wiring space S for the cables Ka, Kb . . . is not provided, the ring-like shape or the cylindrical shape is not required. A case was shown in which the rotation input section 2 is configured so that the outer periphery face 11o has at least the cam body 3c of the oval shaft 3 formed in an integrated manner. However, another cam body 3c may also be attached by a predetermined attaching means. A case was illustrated in which the output plate 7 is configured by layering the plurality of spring plate members 7p . . . having the predetermined thickness Ls in the axial direction Fs. However, an integrated (or individual) output plate 7 may also be used.

A case was described in which the flex gear 4 is engaged at the two engagement positions T, T having a positional relation of 180[°] relative to the inner gear 5g of the internal gear 5. However, the cam body 3c may also be formed to have a triangular, square, or pentagon shape so that the engagement is performed at three engagement positions T . . . , four engagement positions T . . . , or five engagement positions T . . . . A case was illustrated in which the rotation output mechanism 6 has the ring-like shape output plate retainer 12 that is rotatably supported and that has the ring concave section 12h having the end face 12s to retain the output plate 7. However, this function may also be achieved by other configurations. A case was illustrated in which each transmission pin 4p . . . is provided to correspond to the position of each teeth (peak section) 4gs in the outer gear 4g. However, the transmission pin 4p . . . is not always required to be provided to correspond to the position of each teeth (peak section) 4gs in the outer gear 4g. The quantity and interval of the respective transmission pins 4p . . . do not have to be the same as the quantity and interval of the respective teeth (peak sections) 4gs . . . . As an inputted rotational motion, the rotational motion of the drive motor 34 was illustrated. However, various other rotational motion sources may also be applied. The respective components were illustratively formed by metal material. However, the components may also be formed by synthetic resin material or fiber reinforced composite material for example, and components not requiring elasticity may be formed by ceramics material for example and is not limited to any material. A case was illustrated in which the inner periphery face of the flex gear 4 has the U-like notches 4c . . . formed in the radiation direction Fd at the respective positions corresponding to the valleys 4gd . . . among the respective teeth (peak sections) 4gs . . . . However, the notch 4c . . . may have arbitrary shape or position (interval) and is not always required.

The rotation deceleration transmission apparatus according to this invention can be used as various rotation deceleration transmission apparatuses that require a function to receive a rotational motion to reduce the speed of the rotational motion, including a joint mechanism to connect arm sections of an industrial robot.

CITATION LIST

Patent Literature

Patent Literature 1
Japanese Published Unexamined Patent Application Publication 60-098246
Patent Literature 2
Japanese Published Unexamined Patent Application Publication 61-146490
Patent Literature 3
Japanese Published Unexamined Patent Application Publication 64-011777

The invention claimed is:
1. A rotation deceleration transmission apparatus for receiving a rotational motion to reduce the speed of the rotational motion and output the resultant rotational motion, comprising:
  a rotation input section for receiving rotational motion;
  an oval shaft that includes a cam body rotating with the rotation input section in an integrated manner and a plurality of rolling elements that are sandwiched between an inner ring provided along an outer periphery of the cam body and a flexible outer ring;
  an internal gear having an inner gear teeth at an inner periphery and having a fixed position;
  a flex gear having outer gear teeth that are formed along a circumferential direction of an outer periphery thereof and that have a reduced teeth number relative to the inner gear teeth so that, when the outer gear teeth are provided at an outer periphery of the oval shaft, the outer gear teeth are engaged with the inner gear teeth at a plurality of engagement positions in the circumferential direction, the flex gear has a plurality of transmission pins that protrude from a side face and that are provided along the circumferential direction to have a predetermined interval thereamong; and a rotation output mechanism having an output plate having an engagement section including an engagement hole that is movably engaged with each transmission pin and that is provided along the circumferential direction with a predetermined interval to allow the displacement of the transmission pin relative to the output plate in the circumferential direction and/or a radiation direction during the rotation transmission, wherein: the transmission pin is composed of a transmission pin body protruding from the flex gear and a transmission roller having a center position rotatably supported around the transmission pin body as an axis.

2. The rotation deceleration transmission apparatus according to claim 1, wherein: the output plate is formed to have a ring shape.

3. A rotation deceleration transmission apparatus for receiving a rotational motion to reduce the speed of the rotational motion and output the resultant rotational motion, comprising:

a rotation input section for receiving rotational motion;

an oval shaft that includes a cam body rotating with the rotation input section in an integrated manner and a plurality of rolling elements that are sandwiched between an inner ring provided along an outer periphery of the cam body and a flexible outer ring;

an internal gear having an inner gear teeth at an inner periphery and having a fixed position;

a flex gear having outer gear teeth that are formed along a circumferential direction of an outer periphery thereof and that have a reduced teeth number relative to the inner gear teeth so that, when the outer gear teeth are provided at an outer periphery of the oval shaft, the outer gear teeth are engaged with the inner gear teeth at a plurality of engagement positions in the circumferential direction, the flex gear has a plurality of transmission pins that protrude from a side face and that are provided along the circumferential direction to have a predetermined interval thereamong; and a rotation output mechanism having an output plate having an engagement section including an engagement hole that is engaged with each transmission pin and that is provided along the circumferential direction with a predetermined interval to allow the displacement of the transmission pin in the circumferential direction and/or a radiation direction during the rotation transmission, wherein: the engagement section is configured by a multidirectional engagement hole that is formed in the output plate, that is always abutted to a peripheral surface of the transmission pin, and that allows the displacement of the transmission pin in the circumferential direction and the radiation direction of the output plate.

4. The rotation deceleration transmission apparatus according to claim 1, wherein: the engagement section is configured by an elastic engagement section that protrudes from the output plate in the radiation direction, that is always abutted to a peripheral surface of the transmission pin, and that has a one-direction engagement hole allowing the displacement of the transmission pin in the radiation direction to thereby provide the elastic displacement in the circumferential direction.

5. The rotation deceleration transmission apparatus according to claim 4, wherein: the elastic engagement section is configured by layering a plurality of spring plate members having a predetermined thickness in the axial direction.

6. The rotation deceleration transmission apparatus according to claim 1, wherein: the rotation input section is configured by a cylindrical input rotation body in which the interior of an inner periphery face is included in a wiring space for cables, and an outer periphery face has at least the cam body of the oval shaft.

7. The rotation deceleration transmission apparatus according to claim 1, wherein: the flex gear is engaged at two engagement position having a positional relation of 180° relative to the inner gear of the internal gear.

8. The rotation deceleration transmission apparatus according to claim 2, wherein: the engagement section is configured by a multidirectional engagement hole that is formed in the output plate, that is always abutted to a peripheral surface of the transmission pin, and that allows the displacement of the transmission pin in the circumferential direction and the radiation direction of the output plate.

9. The rotation deceleration transmission apparatus according to claim 2, wherein: the engagement section is configured by an elastic engagement section that protrudes from the output plate in the radiation direction, that is always abutted to a peripheral surface of the transmission pin, and that has a one-direction engagement hole allowing the displacement of the transmission pin in the radiation direction to thereby provide the elastic displacement in the circumferential direction.

* * * * *